Figure 2:
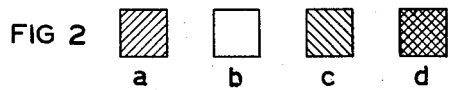

July 25, 1950   J. H. PALIN   2,516,410
PUZZLE
Filed Feb. 27, 1946   3 Sheets-Sheet 1
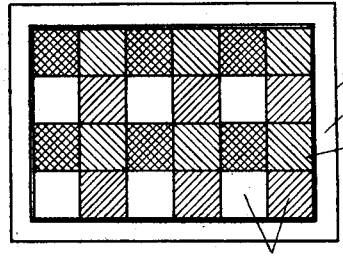
FIG 3    FIG 1 a  b  c  d
FIG 4
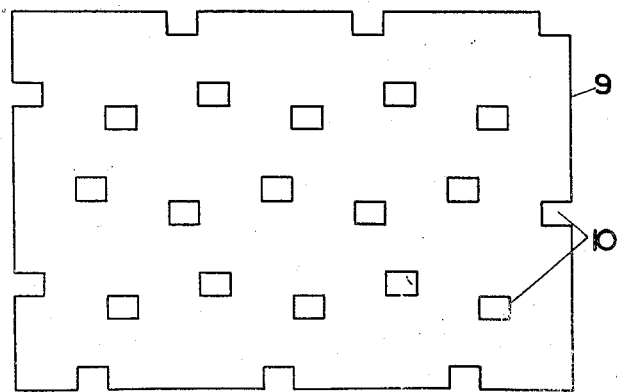
FIG 5
Inventor:
J. H. Palin
By C. F. Wenderoth
Atty

July 25, 1950 J. H. PALIN 2,516,410
PUZZLE
Filed Feb. 27, 1946 3 Sheets-Sheet 2
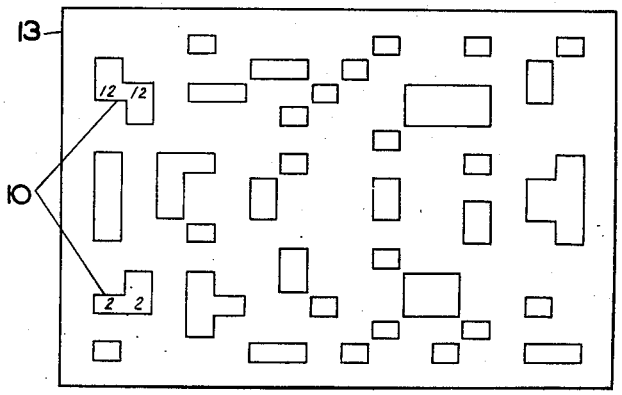

July 25, 1950  J. H. PALIN  2,516,410
PUZZLE

Filed Feb. 27, 1946  3 Sheets-Sheet 3

Inventor:
J. H. Palin
By E. F. Wendworth
Atty

Patented July 25, 1950

2,516,410

UNITED STATES PATENT OFFICE 2,516,410

PUZZLE

Johan Hemming Palin, Stockholm, Sweden

Application February 27, 1946, Serial No. 650,475
In Sweden September 6, 1945

3 Claims. (Cl. 35—35)

The present invention refers to a puzzle, consisting of a board divided into sections provided with markings of place, and a number of pieces, corresponding to the field of the board, which are for the placing on the field of the board furnished with indirect indication marks, different from the position marks of the corresponding position section, in consequence whereof the piece in question only after that the problem specific for a piece has been solved, can be placed on that section, which together with the piece forms a pair. The puzzle is designed to serve for pedagogical, psychotechnical and other similar purposes. The invention is primarily characterized in that the pieces are provided with control designations, arranged in such way that in combination with the recesses in one or several patterns belonging to the puzzle they can serve as means of checking the correct placing of the pieces and also as a means for identifying incorrectly placed pieces. If the puzzle is used in connection with instructions, a possibility is thus attained for the teacher or the referee of knowledge, with a simple help means, to quickly judge the discernment of various kinds of knowledge of the person on test. The control markings of the pieces are suitably applied to the back side of the corresponding board, so that if the board with the pieces placed on it is turned over, the checking of the placing of the pieces can be made by taking the board away and putting the pattern on. By giving, moreover, to the control markings special finish, one can thus attain that the person tested cannot with the guidance of the control markings of the separate pieces have any clue for the placing of the pieces on the field of the board.

The invention specially designs such execution of the puzzle that it can be used for testing in a very great number of problems within the same region of knowledge, or for testing knowledge, within the most varied regions of subjects. The problems can alternatively be chosen so that the number of pieces belonging to the game corresponds to as many various answers, in which case the sections of the board are made with place markings different from each other. The problems can, however, also comprise groups of identical answers, when the boards of the fields belonging to the game are made in such a way that they contain identical place markings for the corresponding groups of the field. The puzzle game is conveniently effected with a number of exchangeable field boards with the problems respectively indicated, when it is furnished with separate control patterns corresponding to these various field boards. A special execution of control markings of the pieces with a view to leaving the least possible indication for the correct placing on the field of the board of a piece in question consists in that the control markings of the pieces, which with advantage can correspond to the designation marking of the respective pieces, repeatedly occur on the respective piece in a pattern suited for each separate piece in such a manner that the same set of pieces can be used together with all the section boards and control patterns belonging to the game. At the practical execution of the puzzle game one could make cards or such like, containing a list of the section boards and/or signs of the pieces and the corresponding kinds of signs answering the markings or similar for objects, which according to some principle are or were originally made as belonging together, with a view to enabling the placing of the pieces on the field of the board according to instructions on such card or similar.

The invention is illustrated on the accompanying drawing by the working of examples of a puzzle game designed according to the invention, comprising 24 pieces.

Figure 8:
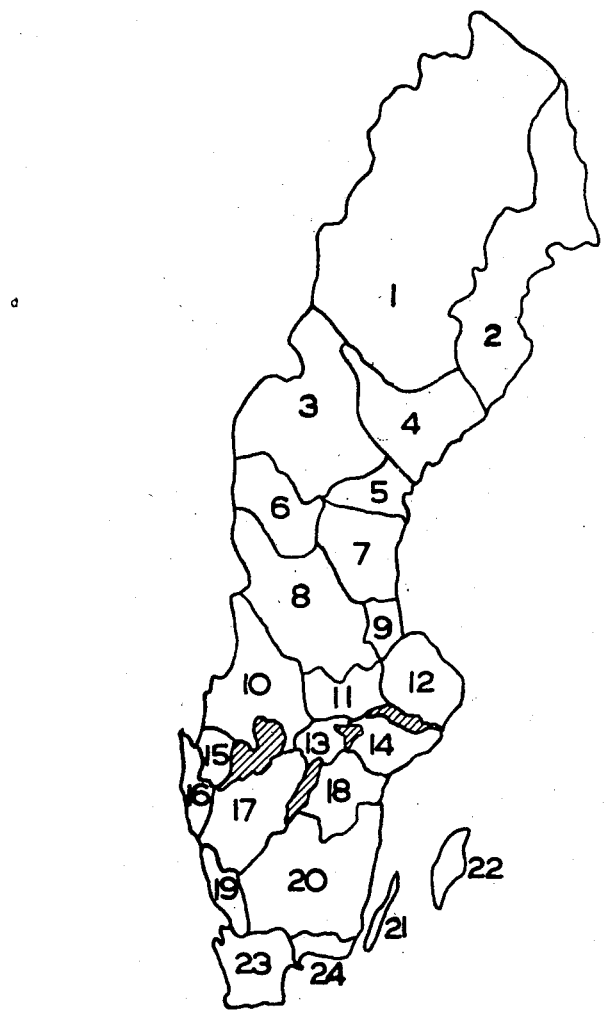

Figure 1 shows a board belonging to the game, which comprises 4 groups of identical sections and Figure 2 shows the respective kinds of place markings for these sections. Figure 3 shows the pieces belonging to the game placed on the board according to a certain problem closely described below. Figure 4 shows the same pieces on an enlarged scale turned with their back sides upwards. Figure 5 shows, also on an enlarged scale, a pattern for controlling that the pieces have been correctly placed when solving the problem in question. Figure 6 shows the pieces placed according to another special problem, also described below, and Figure 7 shows the puzzle game with a laying board designed for this latter task, to which the detail of an index card shown in Figure 8 also belongs. Figure 9 shows on an enlarged scale the pieces placed according to Figure 6 and turned, with a couple of pieces placed for demonstration of the proceeding of the control of the laying. Figure 10 shows a control pattern, likewise on an enlarged scale, applied on the back sides of the pieces according to Figure 9. With regard to the example of executing the puzzle shown, it consists of a board 1, which is provided with a suitable raised frame 2, inside which a changeable support 3 for pieces can be placed. The support 3 shown in Figure 1 is divided into 24 sections 4, which among themselves represent 4 groups of different models or different colours, whereat the models or the colours of the field constitute place markings for the pieces belonging to the game for their placing. The pieces 5 are on their front side 6 provided with figures, which serve as indication markings. A special marking 7 can also be introduced in order to facilitate the direction of the position, so that the pieces are not placed reversed in relation to a certain reading direction. On their back side 8 the pieces 5 are provided with control markings which, as is shown, can be made to agree with the direction number of the piece, so that it appears repeated on the back side of the piece in a pattern specially suited for each piece. In the execution example of the puzzle the back side has been divided into 3 vertical columns of 4 lines each, so that 12 miniature sections are produced, of which 7 have been numbered and 5 left empty. The control pattern consists of a plate 9, provided with recess 10, in which at an eventual incorrect laying of the pieces one or several control markings of the incorrectly placed pieces will be seen when turning the pieces and fixing the pattern. The turning can be done by means of a turnable plate belonging to the game.

The arrangement of support, the placing of the pieces and of the control pattern, shown in Figures 1–5, is intended for solving the following problem as an example of testing knowledge of grammar. The respective sections 4 on the support 3 are supposed to correspond to classes of words, so that a section with a place marking according to Figure 2a constitutes a noun, according to Figure 2b a verb, according to Figure 2c an adjective and according to Figure 2d a pronoun. The numbered pieces are supposed to correspond to the following words:

| | | |
|---|---|---|
| 1. go | 9. house | 17. is |
| 2. chair | 10. big | 18. the |
| 3. you | 11. wrote | 19. pretty |
| 4. red | 12. us | 20. hand |
| 5. I | 13. diligent | 21. look |
| 6. pencil | 14. window | 22. table |
| 7. good | 15. sit | 23. her |
| 8. your | 16. dark | 24. become |

So piece 3, for instance, which corresponds to a pronoun, can be placed on the upper section, lying to the left in Figure 1, viewed according to Figure 2 etc. When turning all the ready-filled pieces as per Figure 3 they take the position shown in Figure 4. The back sides of the pieces, now lying upwards, when covered by pattern 9, Figure 5, do not show any control markings in the recesses 10, and consequently the problem is correctly solved.

When using the game according to Figures 6–11, the problem is supposed to check the knowledge of 24 Swedish counties. The support 11 in Figure 7 is for this purpose divided in sections 12, numbered from "1" to "24." An indication card consisting of a map of Sweden, with counties numbered from "1" to "24" according to Figure 8 belongs to the game. The same pieces described above are used which, as already mentioned, are numbered from "1" to "24." The number of each piece refers to a county, and the placing of the piece on the corresponding section is searched by the means of the following table, belonging to the game:

| | | | |
|---|---|---|---|
| Blekinge | 19 | Vasterbotten | 6 |
| Bohuslan | 10 | Vastergotland | 20 |
| Dalarna | 9 | Vastmanland | 17 |
| Dalsland | 8 | Gastrikland | 15 |
| Gotland | 18 | Halland | 11 |
| Harjedalen | 4 | Halsingland | 2 |
| Jamtland | 22 | Skane | 21 |
| Lappland | 13 | Smaland | 5 |
| Medelpad | 12 | Sodermanland | 3 |
| Narke | 7 | Angermanland | 14 |
| Uppland | 24 | Oland | 16 |
| Varmland | 1 | Ostergotland | 23 |

Figure 6 shows pieces 5 placed according to these directions with the front sides of the pieces 6 turned upwards. Figure 9 shows these pieces turned upside down, the pieces with numbers "2" and "12" having, however, changed places. When checked by means of pattern 13 belonging to the support 11, Figure 10, the incorrect placing of pieces Nos. "2" and "12" becomes apparent through some of their control markings on the back sides being seen in recess 10 of the pattern, when the reference is quickly informed as to the deficient knowledge of the placer in the corresponding part of the region under examination.

Only by varying the support and the directions accompanying the game, examinations within the most varied regions of knowledge can be made a very large number of problems within each special region of knowledge can be arranged, making use of the same set of pieces. With a view to saving material, the upper as well as the lower surface of the support can be divided into sections and patterns used with either the one or the other surface upwards, or turned in various directions of the pattern from case to case.

I claim:

1. A puzzle comprising a board divided into marked fields, a plurality of pieces forming part of the puzzle to be arranged on said fields, said pieces being each provided with marks on two opposite sides, on one side thereof such mark appearing alone as indication means to place the piece correctly on the board, on the other side thereof such mark appearing repeatedly in a control pattern characteristic of each piece, and a sheet provided with apertures for each piece designed to permit only blank spaces of the patterned sides of the pieces to be exposed through said apertures when the pieces are correctly placed on the board and to permit the control pattern at least partly to appear of a piece when placed incorrectly.

2. A puzzle comprising a board divided into marked fields, a plurality of pieces forming part of the puzzle to be arranged on said fields, said pieces being each provided with corresponding marks on two opposite sides, on one side thereof such mark appearing alone as indication means to place the piece correctly on the board, on the other side thereof a similar mark appearing repeatedly in a control pattern characteristic of each piece, and a sheet provided with apertures for each piece designed to permit only blank spaces of the patterned sides of the pieces to be exposed through said apertures when the pieces are correctly placed on the board and to permit the control pattern at least partly to appear of each incorrectly placed piece.

3. A puzzle comprising a board divided into marked fields, a plurality of pieces forming part of the puzzle to be arranged on said fields, said pieces being each provided with marks on two opposite sides, on one side thereof such mark appearing alone as indication means to place the piece correctly on the board, on the other side thereof such mark appearing repeatedly in a control pattern characteristic of each piece, means containing an index of the markings on the pieces and the board correlated to questions and answers, respectively, the answering of the questions giving indications as to the correct placing of the pieces on the board, and a sheet provided with apertures for each piece designed to permit only blank spaces of the patterned sides of the pieces to be exposed through said apertures when the pieces are correctly placed on the board and to permit the control pattern at least partly to appear of a piece when placed incorrectly.

JOHAN HEMMING PALIN.

REFERENCES CITED

The following references are of record in the file of this patent:

UNITED STATES PATENTS

| Number | Name | Date |
| --- | --- | --- |
| 717,105 | Mansfield | Dec. 30, 1902 |
| 760,384 | Dieterich | May 17, 1904 |
| 1,567,154 | Knutson | Dec. 29, 1925 |
| 1,586,628 | Lauterbach | June 1, 1926 |
| 1,613,204 | Smith | Jan. 4, 1927 |
| 1,769,961 | Norrell | July 8, 1930 |
| 1,781,047 | Bondeson | Nov. 11, 1930 |
| 1,867,511 | Kinnaird | July 12, 1932 |
| 1,892,318 | Pressey | Dec. 27, 1932 |